United States Patent
Morgan

(10) Patent No.: US 9,213,622 B1
(45) Date of Patent: Dec. 15, 2015

(54) SYSTEM FOR EXCEPTION NOTIFICATION AND ANALYSIS

(71) Applicant: Square, Inc., San Francisco, CA (US)

(72) Inventor: Timothy Ben Morgan, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 64 days.

(21) Appl. No.: 13/804,388

(22) Filed: Mar. 14, 2013

(51) Int. Cl.
*G06F 9/44* (2006.01)
*G06F 11/36* (2006.01)
*G06F 11/14* (2006.01)

(52) U.S. Cl.
CPC .............. *G06F 11/3636* (2013.01); *G06F 8/30* (2013.01); *G06F 11/1471* (2013.01); *G06F 11/3664* (2013.01)

(58) Field of Classification Search
CPC ............. F06F 11/3636; G06F 11/3636; G06F 11/1471; G06F 11/3664; G06F 8/30
See application file for complete search history.

(56) References Cited

U.S. PATENT DOCUMENTS

| | | | | |
|---|---|---|---|---|
| 6,353,924 | B1* | 3/2002 | Ayers et al. | 717/128 |
| 7,028,056 | B1* | 4/2006 | Hendel | G06F 11/3636 1/1 |
| 8,719,791 | B1* | 5/2014 | MacPherson et al. | 717/124 |
| 8,966,453 | B1* | 2/2015 | Zamfir | G06F 8/30 714/38.1 |
| 9,009,539 | B1* | 4/2015 | Kompotis | G06F 11/3636 714/38.1 |
| 2003/0074602 | A1* | 4/2003 | Lomet | G06F 11/1471 714/15 |
| 2003/0115570 | A1* | 6/2003 | Bisceglia | 717/101 |
| 2004/0003326 | A1* | 1/2004 | Lizuka | G06F 11/3636 714/45 |
| 2006/0179349 | A1* | 8/2006 | Tyma | G06F 11/3636 714/38.11 |
| 2008/0046860 | A1* | 2/2008 | Kratschmer et al. | 717/101 |
| 2009/0070734 | A1* | 3/2009 | Dixon et al. | 717/102 |
| 2010/0153927 | A1* | 6/2010 | Stall et al. | 717/128 |
| 2010/0211932 | A1* | 8/2010 | Jones et al. | 717/124 |
| 2010/0281303 | A1* | 11/2010 | Cates | 714/33 |
| 2011/0258609 | A1* | 10/2011 | Maczuba | 717/128 |
| 2011/0314438 | A1* | 12/2011 | Surazski et al. | 717/100 |
| 2013/0061210 | A1* | 3/2013 | Chung | G06F 11/3664 717/125 |
| 2013/0091492 | A1* | 4/2013 | Mizrahi | 717/124 |
| 2013/0152056 | A1* | 6/2013 | Chang et al. | 717/131 |
| 2013/0290205 | A1* | 10/2013 | Bonmassar | G06Q 10/1053 705/321 |
| 2014/0181592 | A1* | 6/2014 | Andrew | G06F 11/3664 714/38.1 |

OTHER PUBLICATIONS

Wikipedia. *Bug Tracking System*. Last modified on Apr. 21, 2014. Retrieved on Jun. 6, 2014. Retrieved from the Internet: URL<http://en.wikipedia.org/wiki/Bug_tracking_system>. 3 pages.

* cited by examiner

*Primary Examiner* — Tuan Q. Dam
*Assistant Examiner* — Ziaul A Chowdhury
(74) *Attorney, Agent, or Firm* — Novak Druce Connolly Bove + Quigg LLP

(57) ABSTRACT

A method of receiving a stack trace, where the stack trace refers to executed code that crashed; identifying one or more lines of the executed code that caused the executed code to crash; identifying, from a code repository, contact information of a developer from a plurality of developers that are responsible for the executed code, where the developer is responsible for a code commit that refers to the one or more lines of the executed code; and notifying, through the contact information, the developer that the one or more lines caused the executed code to crash.

9 Claims, 3 Drawing Sheets

```
* thread #1: tid = 0x1f03, 0x01983caa exception_throw
    frame #0: 0x01983caa dylib_objc_exception_throw
    frame #1: 0x17de644 CoreFoundation - [__NSArrayI objectAtIndex:]
    frame #2: 0x000c18ad Test – [HelloWorldLayer test] at HelloWorldLayer.m: 34
    frame #3: 0x000c194e Test – [HelloWorldLayer init] at HelloWorldLayer.m:45
    frame #4: 0x0003fe01 Test + [CCNode node] at CCNode.m:258
    frame #5: 0x000c17ed Test + [HelloWorldLayer scene] at HelloWorldLayer.m:22
    frame #6: 0x000c0e8c Test – [AppDelegate applicationDidFinishLaunching:] at AppDelegate.m:113
```

SYSTEM FOR EXCEPTION NOTIFICATION AND ANALYSIS

TECHNICAL FIELD

This disclosure relates to a system for exception notification and analysis.

BACKGROUND

An exception, e.g., an out of bounds access or invalid memory access, can be thrown when an executing program crashes or upon any exceptional occurrence, even if it does not result in a crash. Debuggers can display information about the exception when it occurs. For example, the debugger can display a stack trace. The stack trace is a report of active stack frames in a call stack at a certain point in time during execution of the running program, e.g., when the program crashes. The stack frames can refer to one or more positions, e.g., line numbers, in code. Generally, a software developer attempts to debug the code based on the stack frames and other error messages, e.g., error logs coded by the software developer.

SUMMARY

A system for exception notification and analysis can identify code that is responsible for throwing an exception and notify a developer responsible for the code. For example, the system can identify the code by analyzing a stack trace during an occurrence of the exception. Based on the identified code, the system can determine contact information, e.g., from a code repository, of a developer responsible for the code and can notify the developer. The system can also group the occurrence of the exception with previous occurrences of the exception.

In one aspect, receiving a stack trace, where the stack trace refers to executed code that crashed; identifying one or more lines of the executed code that caused the executed code to crash; identifying, from a code repository, contact information of a developer from a plurality of developers that are responsible for the executed code, where the developer is responsible for a code commit that refers to the one or more lines of the executed code; and notifying, through the contact information, the developer that the one or more lines caused the executed code to crash.

Implementations can include one or more of the following. Identifying one or more lines of the executed code comprises: assigning a score to each line of code referred to in the stack trace, where the score is based at least on a position, in a call stack associated with the stack trace, of a stack frame associated with the respective line and a last modified date of the respective line; identifying one or more lines based on the score. The code repository maintains a commit log, and where identifying contact information of the developer comprises identifying, from the commit log, the developer responsible for a most recent code commit that refers to the one or more lines. Providing the one or more lines for display in a news feed of the developer. Generating a new occurrence report; determining whether the one or more lines of code has caused previous crashes; and if so, associating the new occurrence report with the previous crashes.

Advantages may include one or more of the following. One responsible developer, as opposed to an entire development team, can be notified when and where an exception occurs. Therefore, the developer can quickly fix any related bugs. The system can also track and report multiple occurrences of the exception.

BRIEF DESCRIPTION OF THE DRAWINGS

FIG. 3 is text of an example stack trace displayed by a debugger when an exception is thrown.

Like reference numbers and designations in the various drawings indicate like elements.

DETAILED DESCRIPTION

Figure 1:
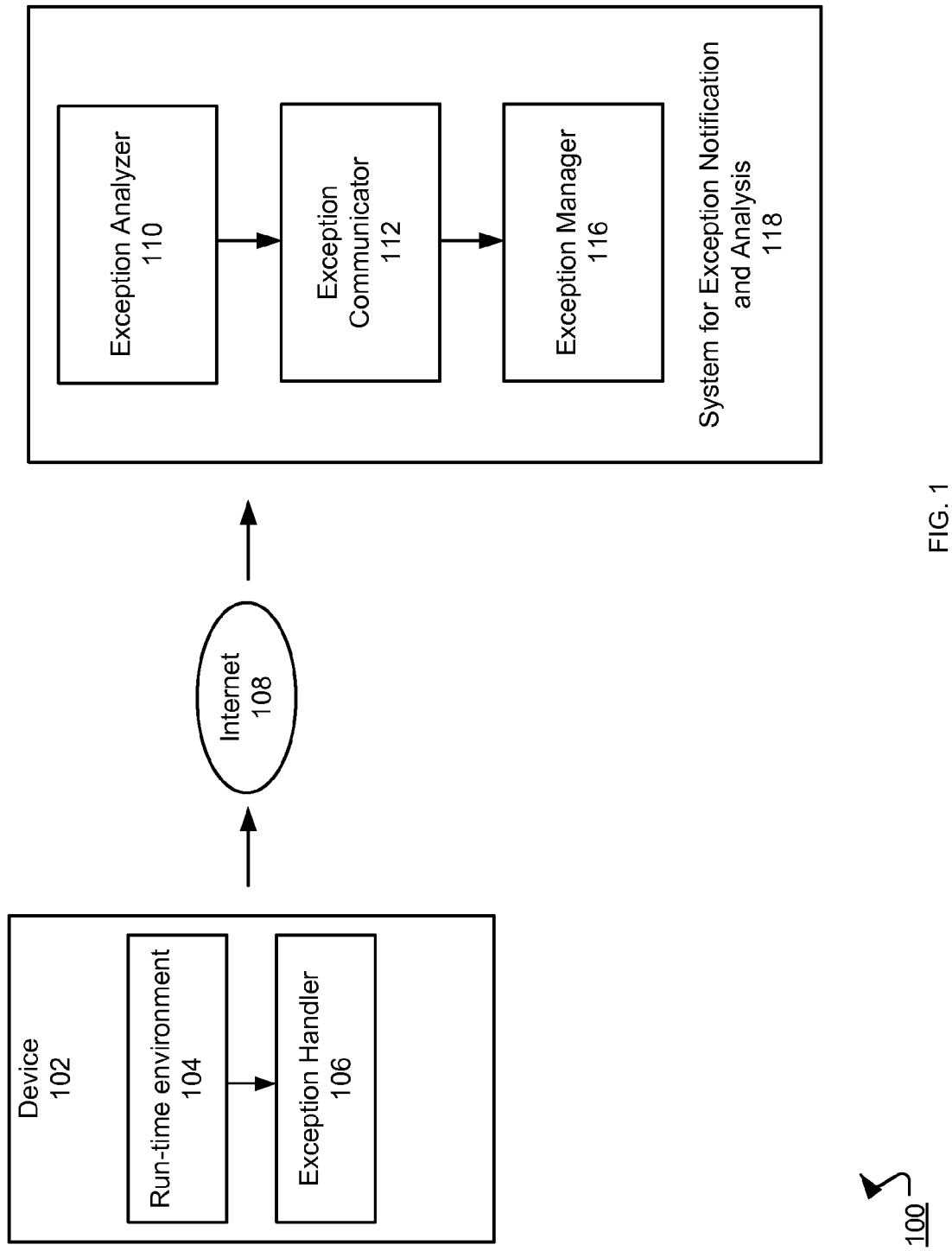
FIG. 1 is a schematic illustration of an example architecture used by a system for exception notification and analysis.

FIG. 1 is a schematic illustration of an example architecture 100 used by a system for exception notification and analysis 118. The architecture 100 can include a device 102, which is a computing device, e.g., a smartphone, a tablet, a desktop computer, a laptop computer, a server, or other data processing apparatus. The device 102 can include a run-time environment 104. The run-time environment 104 implements instructions, e.g., code, based on a computer language, e.g., using one or more processors. The computer language can be a compiled language, an interpreted language, or an embedded language. Code can be executed in the run-time environment 104. Occasionally, code can crash. When code crashes, the run-time environment 104 can throw an exception, which is sent to an exception handler 106.

The exception handler 106 can save a state of execution when the exception is thrown. For example, the state of execution can be represented by a call stack. The call stack is a data structure that stores information about active subroutines of a computer program. An active subroutine, which corresponds to a respective stack frame in a stack trace, is code that has been called but has not finished executing. In some implementations, device 102 includes a debugger. The debugger can provide an interface that displays, e.g., through a display of the device 102, a stack trace. The stack trace includes data from the call stack and is organized in a developer-friendly manner. In particular, the stack trace can refer to line numbers of executed code running on the call stack. An example of a stack trace is described further below in reference to FIG. 3.

The device 102 can send the exception and data associated with the exception, e.g., the call stack, to the system for exception notification and analysis 118 over a network 108, e.g., the Internet 108. The system 118 can be one or more computing devices, e.g., a desktop or server computer. The system 118 can include an exception analyzer 110. The exception analyzer 110 analyzes the exception and the call stack. The exception analyzer 110 identifies a party, e.g., a developer, responsible for the exception. The exception analyzer 110 will be described further below in reference to FIGS. 2 and 3.

The exception communicator 112 notifies the party responsible for the exception. For example, the exception communicator 112 can send an email to the party with information about the exception. The exception communicator 112 can forward the data associated with the exception to an exception manager 116.

The exception manager 116 can categorize the exception by bug and occurrence. The exception manager 116 determines whether the exception has occurred before. For example, the exception manager 116 can store each reported occurrence of an exception and data associated with the occurrence, e.g., a stack trace or timestamp, in a database. The exception can match a previously reported occurrence if the stack traces are substantially equivalent. In some implementations, the exception manager 116 scores each line of the stack trace, e.g., based on the a position of the line in the stack trace and/or the line's last modified date, and compares the highest scoring line with highest scoring lines in stack traces of other occurrences. If the lines match, the exception can be matched to the other occurrences. The rest of the stack trace can be ignored. If the exception has never occurred before, the exception manager 116 can create a new bug report and can associate the exception with the new bug report. If the exception has occurred before, the exception manager 116 can associate the occurrence with the respective bug report and can update a number of occurrences associated with the exception, e.g., in the database.

Figure 2:
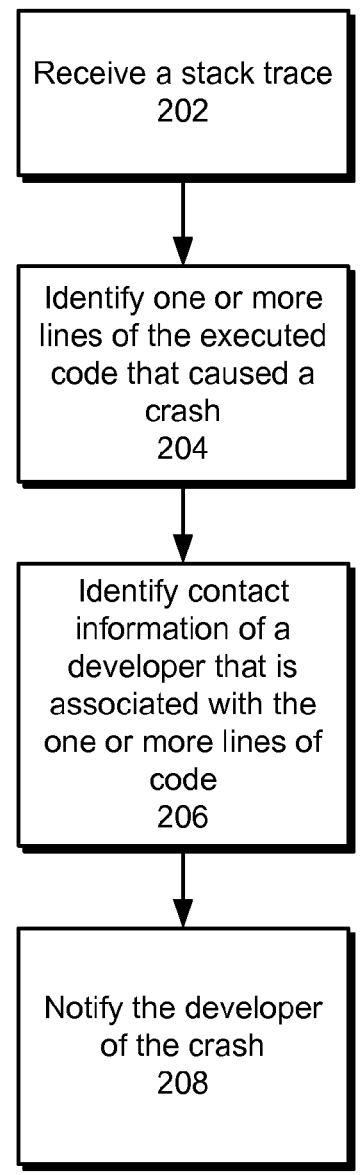
FIG. 2 is a diagram of an example flow chart for a method of debugging code using the system for exception notification and analysis.

FIG. 2 is a diagram of an example flow chart 200 for a method of debugging code using the system for exception notification and analysis. For convenience, the process will be described with respect to a system for exception notification and analysis, e.g., the system 118 described above in reference to FIG. 1.

The system receives a stack trace (step 202), e.g., from a device. In some implementations, the system receives the stack trace from a database of stored stack traces. That is, applications can store a stack trace in the system for future processing. Upon receiving the stack trace, the system can associate the stack trace with an occurrence, as described above in the exception manager in reference to FIG. 1.

The system identifies, in the stack trace, one or more lines of executed code that caused a crash (step 204). This is described further below in reference to FIG. 3.

The system identifies contact information of a developer who is associated with the one or more lines of code (step 206). The system can access the contact information, e.g., an email, from a code repository that manages the one or more lines of code. The code repository can track every code commit and data associated with the code commit, e.g., an identity, contact information of the developer, and a timestamp of each commit. The system can search through code commits, e.g., starting from code that is most recently committed. The system can locate a most recent code commit that refers to the one or more lines identified as causing the crash and can identify contact information associated with the code commit.

The system notifies the developer responsible for the one or more lines based on the contact information (step 208). The system can send an email to the developer. The email can include the one or more lines and the stack trace. Therefore, instead of notifying an entire development team that a crash has occurred, the system can notify only the developer responsible for the code and the developer can take further action to fix the code.

In some implementations, the system provides the occurrence for display in a news feed of the developer. For example, the developer can subscribe to a news feed of updates. The system can publish the occurrence to the news feed, and the developer can view the occurrence in the news feed using a device. Other developers can also interact and comment on the occurrence through the news feed.

FIG. 3 is text 300 of an example stack trace 302 displayed by a debugger when code crashes, e.g., an exception is thrown. The stack trace 302 can separate active frames by executing threads. In FIG. 3, the exception occurs on Thread #1. The highest active frame is Frame #0 and the lowest shown stack frame is Frame #6. The highest active stack frame corresponds to a most recent call to a subroutine which has not yet terminated. In other words, in FIG. 3, the application Test first calls [HelloWorldLayer init] (frame #3), which then, at line 45 in the method "init", calls [HelloWorldLayer test] (frame #2), which then, at line 34 in the method "test", calls [_NSArrayI objectAtIndex:] (frame #1), which is a method in the CoreFoundation library.

A system for exception notification and analysis, e.g., the system described above in reference to FIG. 2, can analyze the exception based on the stack trace. The system identifies one or more lines of the code that caused the code to crash. In particular, the system identifies line numbers of files indicated in the stack trace. As indicated by frames #2, #3, and #5, lines 22, 34, and 45 in HelloWorldLayer.m may have caused the crash. Similarly, line 258 in CCNode.m or line 113 in AppDelegate.m may have also caused the crash.

In some implementations, the system assigns a score to each line of code referred to in the stack trace. The score can be based on position of a corresponding stack frame on a call stack. If a particular line of code is high in the call stack, e.g., has a high active stack frame, the line can be assigned a higher score than a particular line that is low in the call stack. The score can also be based on a last modified date of the respective line of code. If the line of code was modified recently, the line of code can be assigned a higher score than if the line of code was never modified. The assigned score can be a function of one or both of the position of the stack frame in the call stack and the modification date. The system can assume code that cannot be modified, e.g., linked libraries, did not cause the crash and can skip such code.

By way of illustration, in reference to FIG. 3, HelloWorldLayer.m and AppDelegate.m files can be project files and CCNode.m can be a library file. The system can assign scores from a high stack frame to a low stack frame. Frame #0 and Frame #1 are associated with linked libraries and are not modifiable. Therefore, the system can presume the libraries did not cause the crash and can skip to Frame #2. Frame #2 refers to HelloWorldLayer.m at line 34 and frame #3 refers to the same file at line 45. The system can access the code repository to identify the dates that each line was last modified. Because frame #2 is higher in the call stack than frame #3, line 34 can be initially assigned a higher score than frame #3. However, if line 45 is more recently modified than line 34, the score for line 45 of frame #3 can be higher than the score for line 34 of frame #2. In some implementations, the position of the stack frame in the call stack is weighed more heavily than a last modification date. In some other implementations, the last modification date is weighed more heavily than the position in the call stack.

The system can identify one or more lines based on the score. In some implementations, the system identifies one or more lines satisfying a threshold value. In some other implementations, the system identifies one or more lines that have the highest score. The system then notifies a developer responsible for the identified lines, as described above in reference to FIG. 2.

Although the method described above is applied to stack traces, the method can also be applied to symbolication, deobfuscation, and source-mapping of exception stack traces using developer-provided symbol data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for debugging code comprising:
   receiving a stack trace, where the stack trace refers to executed code of a program that crashed;
   identifying, based at least in part on the stack trace, one or more lines of code that caused the program to crash by:
      assigning a respective score to each line of code referred to in the stack trace, where the score is based at least on a position, in a call stack associated with the stack trace, of a stack frame associated with the respective line, and a last modified date of the respective line, and
      identifying the one or more lines based on their respective scores;
   identifying, from a code repository and based at least in part on the one or more identified lines, contact information of a developer that is responsible for performing a code commit that refers to the one or more lines of code;
   sending, using the contact information, a notification to the developer that the one or more lines caused the program to crash;
   generating a new occurrence report that describes the program that crashed;
   determining that the one or more lines of code has caused at least one previous crash; and
   associating the new occurrence report with the at least one previous crash.

2. The method of claim 1, where the code repository maintains a commit log, and where identifying contact information of the developer comprises identifying, from the commit log, the developer responsible for a most recent code commit that refers to the one or more lines.

3. The method of claim 1, further comprising providing the one or more lines for display in a news feed of the developer.

4. A system comprising:
   a processor; and
   computer-readable medium coupled to the processor and having instructions stored thereon, which, when executed by the processor, cause the processor to perform operations comprising:
      receiving a stack trace, where the stack trace refers to executed code of a program that crashed;
      identifying, based at least in part on the stack trace, one or more lines of the code that caused the program to crash by:
         assigning a respective score to each line of code referred to in the stack trace, where the score is based at least on a position, in a call stack associated with the stack trace, of a stack frame associated with the respective line, and a last modified date of the respective line, and
         identifying the one or more lines based on their respective scores;
      identifying, from a code repository and based at least in part on the one or more identified lines, contact information of a developer that is responsible for performing a code commit that refers to the one or more lines of code;
      sending, using the contact information, a notification to the developer that the one or more lines caused the program to crash;
      generating a new occurrence report that describes the program that crashed;
      determining that the one or more lines of code has caused at least one previous crash; and
      associating the new occurrence report with the at least one previous crash.

5. The system of claim 4, where the code repository maintains a commit log, and where identifying contact information of the developer comprises identifying, from the commit log, the developer responsible for a most recent code commit that refers to the one or more lines.

6. The system of claim 4, further comprising providing the one or more lines for display in a news feed of the developer.

7. A non-transitory computer-readable medium having instructions stored thereon, which, when executed by a processor, cause the processor to perform operations comprising:
   receiving a stack trace, where the stack trace refers to executed code of a program that crashed;
   identifying, based at least in part on the stack trace, one or more lines of code that caused the program to crash by:
      assigning a respective score to each line of code referred to in the stack trace, where the score is based at least on a position, in a call stack associated with the stack trace, of a stack frame associated with the respective line, and a last modified date of the respective line, and identifying the one or more lines based on their respective scores;

identifying, from a code repository and based at least in part on the one or more identified lines, contact information of a developer that is responsible for performing a code commit that refers to the one or more lines of code;

sending, using the contact information, a notification to the developer that the one or more lines caused the program to crash;

generating a new occurrence report that describes the program that crashed;

determining that the one or more lines of code has caused at least one previous crash; and associating the new occurrence report with the at least one previous crash.

8. The computer-readable medium of claim 7, where the code repository maintains a commit log, and where identifying contact information of the developer comprises identifying, from the commit log, the developer responsible for a most recent code commit that refers to the one or more lines.

9. The computer-readable medium of claim 7, further comprising providing the one or more lines for display in a news feed of the developer.

\* \* \* \* \*